(12) United States Patent
Xu et al.

(10) Patent No.: US 10,969,031 B2
(45) Date of Patent: Apr. 6, 2021

(54) MOVABLE VALVE CORE AND ELECTROMAGNETIC VALVE COMPRISING THE SAME

(71) Applicant: Xiamen Koge Micro Tech Co., Ltd., Fujian (CN)

(72) Inventors: Xiaofeng Xu, Fujian (CN); Haiqiang Fu, Fujian (CN)

(73) Assignee: Xiamen Koge Micro Tech Co., Ltd., Xiamen (CN)

( * ) Notice: Subject to any disclaimer, the term of this patent is extended or adjusted under 35 U.S.C. 154(b) by 66 days.

(21) Appl. No.: 16/154,735

(22) Filed: Oct. 9, 2018

(65) Prior Publication Data
US 2020/0003321 A1    Jan. 2, 2020

(30) Foreign Application Priority Data

| Jul. 2, 2018 | (CN) | 201810719633.6 |
| Jul. 2, 2018 | (CN) | 201821035829.5 |
| Jul. 2, 2018 | (CN) | 201821036574.4 |
| Jul. 2, 2018 | (CN) | 201821036636.1 |

(51) Int. Cl.
*F16K 31/02* (2006.01)
*F16K 1/32* (2006.01)
*F16K 31/06* (2006.01)
*F16K 41/12* (2006.01)

(52) U.S. Cl.
CPC .............. *F16K 31/02* (2013.01); *F16K 1/32* (2013.01); *F16K 31/0627* (2013.01); *F16K 31/0641* (2013.01); *F16K 31/0672* (2013.01); *F16K 41/12* (2013.01); *Y10T 137/86622* (2015.04); *Y10T 137/86686* (2015.04); *Y10T 137/86879* (2015.04); *Y10T 137/86895* (2015.04)

(58) Field of Classification Search
CPC .... F16K 1/36; F16K 31/0641; F16K 31/0627; F16K 1/32; F16K 31/02; F16K 31/0672; F16K 41/12; Y10T 137/86895; Y10T 137/86686; Y10T 137/86622; Y10T 137/86879
USPC ......... 137/870, 872, 883, 625.5; 251/129.15, 251/129.17, 364
See application file for complete search history.

(56) References Cited

U.S. PATENT DOCUMENTS

| 4,513,945 A * | 4/1985 | Otsuki ............... F16K 31/0655 137/863 |
| 5,758,864 A * | 6/1998 | Asai .......................... F16K 7/14 251/129.17 |
| 6,089,538 A * | 7/2000 | Shirkhan .................. F16K 7/12 137/606 |

(Continued)

*Primary Examiner* — Matthew W Jellett

(57) ABSTRACT

The present invention discloses a movable valve core and an electromagnetic valve comprising the same. The movable valve core, comprising a cylindrical core body (1) defining a central axis, a leading head (2) fixed to the core body (1) removably, wherein a water-proof valve membrane (3) sandwiched between the core body (1) and the leading head (2), wherein a mounting hole (4) is axially formed in the core body (1), and a connector (5) for projecting into the mounting hole (4) extends axially from the bottom of the leading head (2), and the connector (5) is fixed into the mounting hole (4). The connector (5) is provided with an outer thread (6), and the leading head (2) is screwed into the mounting hole (4).

7 Claims, 9 Drawing Sheets

(56) References Cited

U.S. PATENT DOCUMENTS

| | | | | |
|---|---|---|---|---|
| 6,488,050 B1* | 12/2002 | Jabcon | ............... | F15B 13/0405 |
| | | | | 137/625.27 |
| 7,428,913 B2* | 9/2008 | Benson | ................... | F16K 1/36 |
| | | | | 137/487.5 |
| 7,878,479 B2* | 2/2011 | Yamamoto | ............... | F16K 1/36 |
| | | | | 251/331 |
| 8,366,655 B2* | 2/2013 | Kamen | ............... | A61M 1/287 |
| | | | | 604/29 |
| 8,505,573 B2* | 8/2013 | Herbert | ............. | F16K 31/0672 |
| | | | | 137/554 |
| 8,576,032 B2* | 11/2013 | Herbert | ................... | F16K 7/16 |
| | | | | 251/129.15 |
| 9,022,349 B2* | 5/2015 | Tung | ....................... | F16K 1/42 |
| | | | | 251/129.15 |
| 9,062,778 B2* | 6/2015 | Fukano | ................. | F16K 41/12 |
| 9,353,886 B2* | 5/2016 | Tung | ........................ | F16K 1/42 |
| 9,993,821 B2* | 6/2018 | Sugiura | ................. | B01L 3/567 |
| 2008/0029174 A1* | 2/2008 | Yoshino | ................ | F16K 41/12 |
| | | | | 137/828 |
| 2019/0067836 A1* | 2/2019 | Mohan | ............... | H01Q 13/085 |

\* cited by examiner

MOVABLE VALVE CORE AND ELECTROMAGNETIC VALVE COMPRISING THE SAME

CROSS-REFERENCE TO RELATED APPLICATION

The present application claims the priority of Chinese application Nos. 201810719633.6, 201821036574.4, 201821036636.1 and 201821035829.5 filed on the same date of Jul. 2, 2018. The above patent applications are incorporated herein by reference in their entity, and constitute part of the description.

TECHNICAL FIELD

The present invention belongs to the field of control switches for valves, and more particularly, relates to a movable valve core and an electromagnetic valve comprising the same.

BACKGROUND ART

Currently, inner armature valves of most electromagnetic valves are generally of a traditional poppet structure or a direct-lifting valve structure. Specifically, a stationary valve core is fixed to an upper portion of a sleeve, and a lower portion of the sleeve is provided thereon with a movable valve core that can move up and down. Moreover, a returning spring is disposed between the stationary valve core and the movable valve core, such that the movable valve core drives a piston disposed on its lower portion to move downward to press against a valve port, and is spaced apart from the stationary valve core by a certain gap.

In the prior art, the movable valve core is basically structured as an integrally formed cylinder. As such, in the movement process of the movable valve core, it is difficult to ensure the sealability of the chamber where the movable valve core is located. Moreover, the movable valve core is generally formed in one step by such machining manners as die-casting, stamping or drawing. Nevertheless, the above machining methods have relatively high demands on the machining precision of the movable valve core. Besides, they are complex in procedures and high in costs, and are thus not suitable for production-line machining.

SUMMARY OF THE INVENTION

Therefore, the present invention provides a movable valve core, comprising a cylindrical core body defining a central axis, a leading head fixed to the core body removably, and a water-proof valve membrane sandwiched between the core body and the leading head, wherein a mounting hole is axially formed in the core body, and a connector for projecting into the mounting hole extends axially from the bottom of the leading head, and the connector is fixed into the mounting hole.

The present invention also provides an electromagnetic valve comprising a valve body and a movable valve core defining a central axis, wherein the valve body comprises a valve seat and a valve cover fixed axially and tightly to the valve seat in a detachable manner, wherein the valve cover defines a first cavity and a second cavity, wherein the first cavity is provided therein with an upper opening and a lower opening, and the second cavity is located below the first cavity and is open to the lower opening of the first cavity; the valve cover is provided with an axial inlet into the first cavity, a first outlet from the upper opening and a second outlet from the second cavity; the movable valve core is located partially within the first cavity and the second cavity; the valve seat is provided therein with a magnetic driving assembly for driving the movable valve core to move up and down, wherein a gasket detachably caps the movable valve core within the first cavity, and the gasket has a first position in which the gasket moves upward to seal the upper opening and open the lower opening and a second position in which the gasket moves downward to seal the lower opening and open the upper opening.

Numerical identifiers: 1—core body; 2—leading head; 3—water-proof valve membrane; 4—mounting hole; 5—connector; 6—outer thread; 7—first shaft section; 8—second shaft section; 9—third shaft section; 10—annular blocking shoulder; 11—flexible petal; 12—flexible notch; 13—guiding surface; 211—first rod section; 212—second rod section; 213—third rod section; 214—first chamfer; 215—second chamfer; 216—cutout; 14—valve body; 15—movable valve core; 16—first cavity; 17—second cavity; 18—upper opening; 19—lower opening; 20—inlet; 21—first outlet; 22—second outlet; 23—gasket; 24—holder; 25—T-shaped groove; 26—valve seat; 27—valve cover; 271—upper valve cover; 272—lower valve cover; 28—annular groove; 29—sealing ring; 30—magnetic driving assembly; 31—electromagnetic coil; 32—stationary iron core; 33—frame; 331—third cavity; 34—spring; 35—main body; 36—insertion portion; 37—receptacle; 38—air vent; 39—outer iron sheet; 40—inner iron sheet; 41—PIN needle; and 42—insulator.

DETAILED DESCRIPTION OF THE INVENTION

The present invention will be described below in further detail in conjunction with the accompanying drawings.

Embodiment 1

Figure 1:
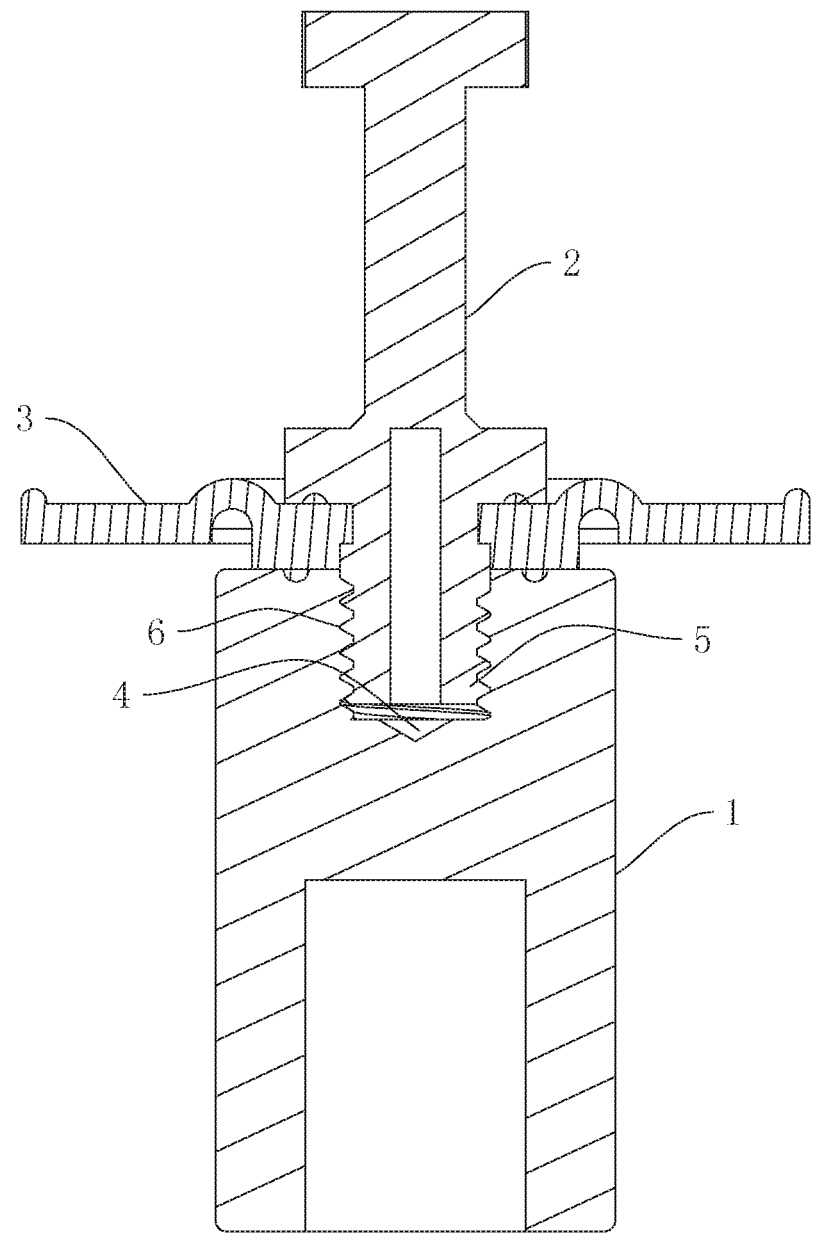
FIG. 1 schematically shows a cross-sectional structural view of Embodiment 1.

As shown in FIG. 1, a movable valve core comprises a core body 1, a leading head 2 and a water-proof valve membrane 3, wherein the leading head 2 is connected to an upper end of the core body 1, and the water-proof valve membrane 3 is sandwiched between the core body 1 and the leading head 2 so as to improve the sealability between the core body 1 and the leading head 2.

As shown in FIG. 1, a mounting hole 4 is disposed on one end of the core body 1 that faces towards the leading head 2, and a connector 5 for projecting into the mounting hole 4 extends from the bottom of the leading head 2; an outer wall of the connector 5 is provided with an outer thread 6, and the leading head 2 is threaded into the mounting hole 4. Meanwhile, a glue may be injected between the outer wall of the connector 5 and the inner wall of the mounting hole 4, which prevents the connector 5 from being loosened, thereby resulting in a firm connection between the connector 5 and the mounting hole 4. In this Embodiment, with the threaded connection, the connector 5 can be fixed to the mounting hole 4. Moreover, the structure is simple, and the maintenance is easy.

In conclusion, as compared with a prior single-piece movable valve core 15, the movable valve core 15 the core body 1 and the leading head 2 are provided separately to manufacture the movable valve core 15 easily. Moreover, this practice may reduce the demands on the overall machining precision and decrease the machining costs. Therefore, this movable valve core is more suitable for a production line.

Embodiment 2

Figure 2:
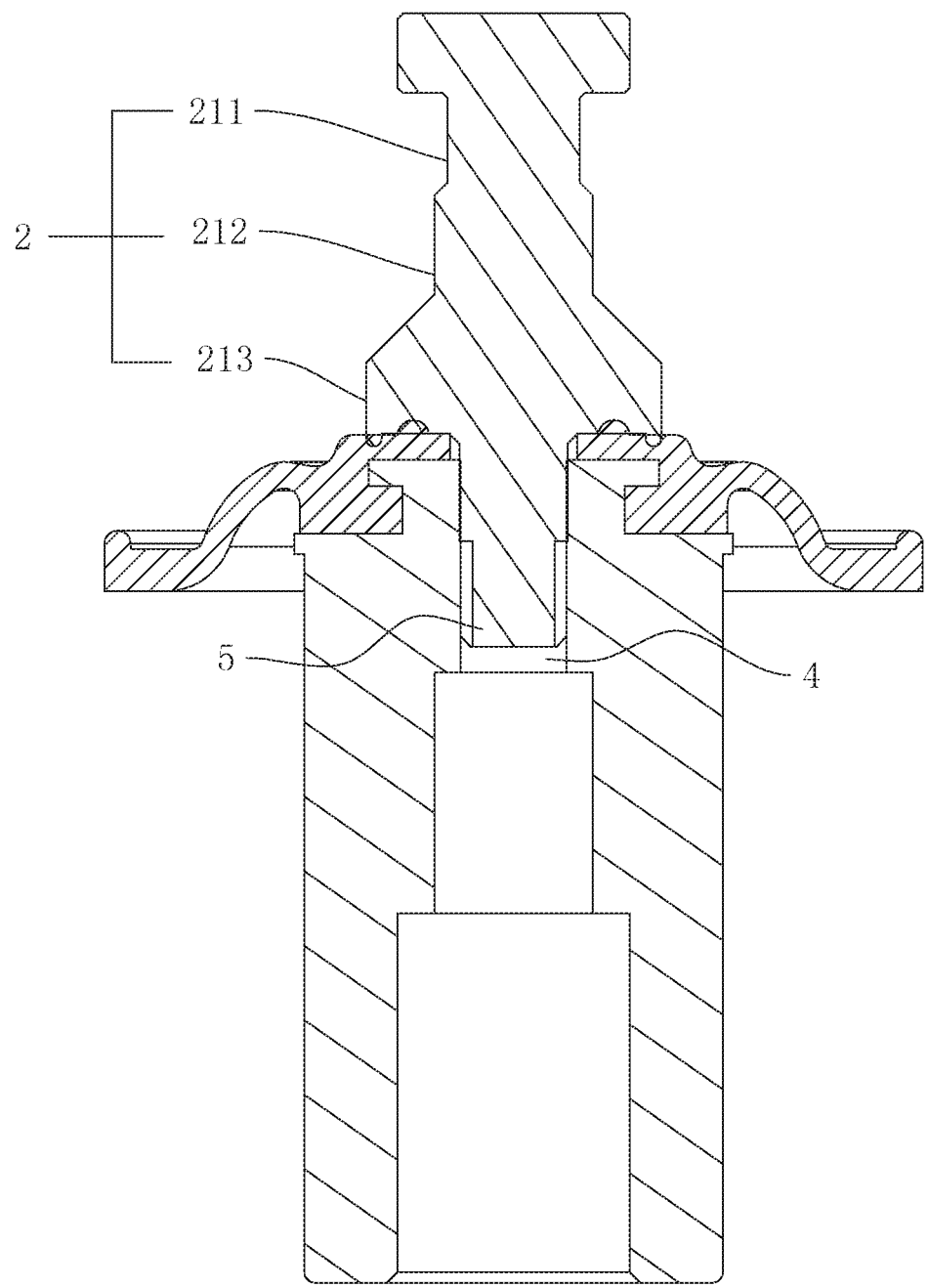
FIG. 2 schematically shows a cross-sectional structural view of Embodiment 2.
Figure 3:
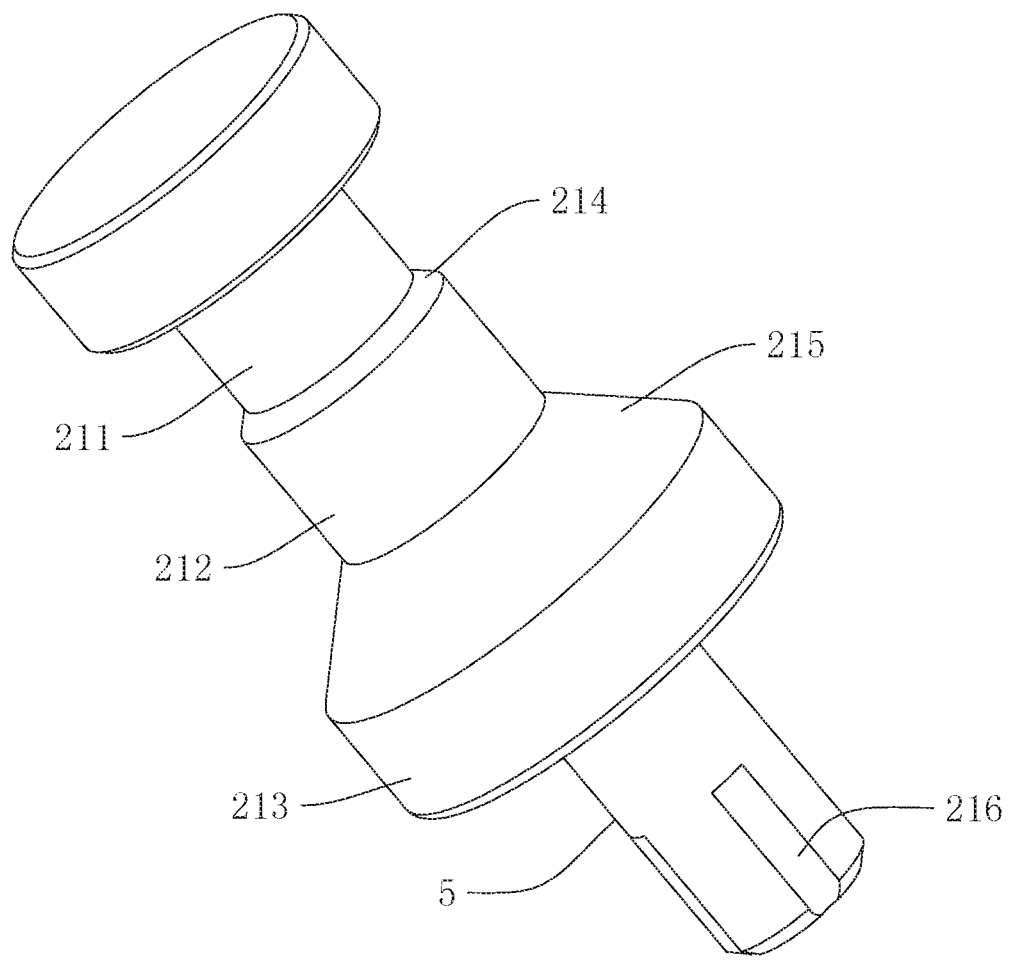
FIG. 3 schematically shows a structural view of a leading head in Embodiment 2.

As shown in FIGS. 2 and 3, a movable valve core is different from Embodiment 1 in that: a leading head 2 comprises a first rod section 211, a second rod section 212 and a third rod section 213 that are connected in series, wherein the diameter of the first rod section 211 is smaller than that of the second rod section 212, and the diameter of the second rod section 212 is smaller than that of the third rod section 213; a first chamfer 214 is disposed between the first rod section 211 and the second rod section 212, and a second chamfer 215 is disposed between the second rod section 212 and the third rod section 213. Therefore, the first rod section 211, the second rod section 212 and the third rod section 213 form a step-shaped leading head such that a liquid can impact on the first chamfer 214 and the second chamfer 215 to achieve a pressure distribution of the liquid.

As shown in FIGS. 2 and 3, a connector 5 is integrally connected to a lower end of the third rod section 213, a number of cutouts 216 are disposed in the outer wall of the connector in a circumferential direction, and the connector 5 is fixed into a mounting hole 4 in an interference fit. Therefore, the connector 5 is fixed to the mounting hole 4 in an interference fit, which can improve the overall machining efficiency. Moreover, the arrangement of cutouts 216 can facilitate the insertion of the connector 5 into the mounting hole 4, and save the material.

Embodiment 3

Figure 4:
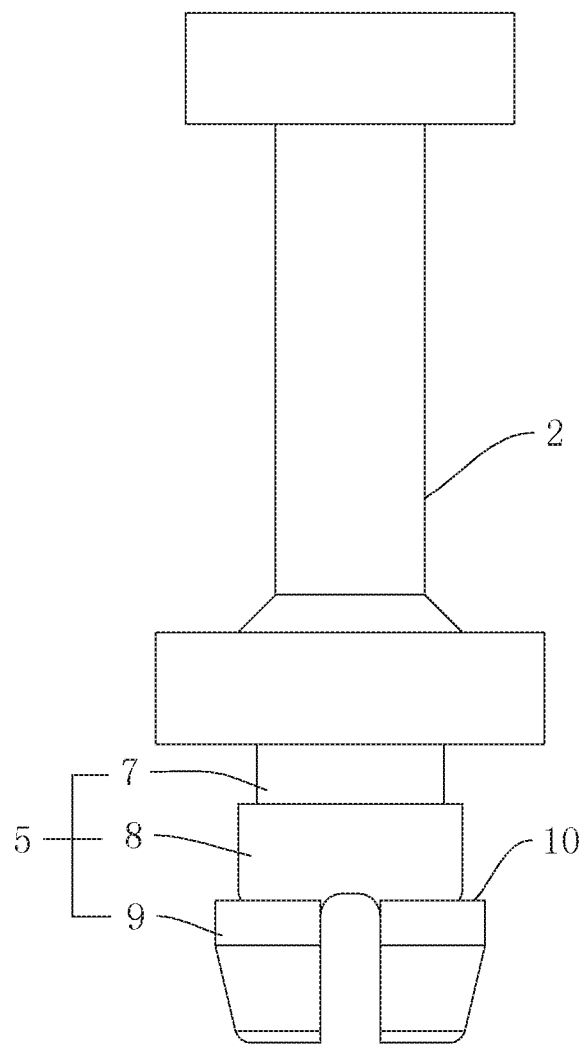
FIG. 4 schematically shows a cross-sectional structural view of Embodiment 3.
Figure 5:
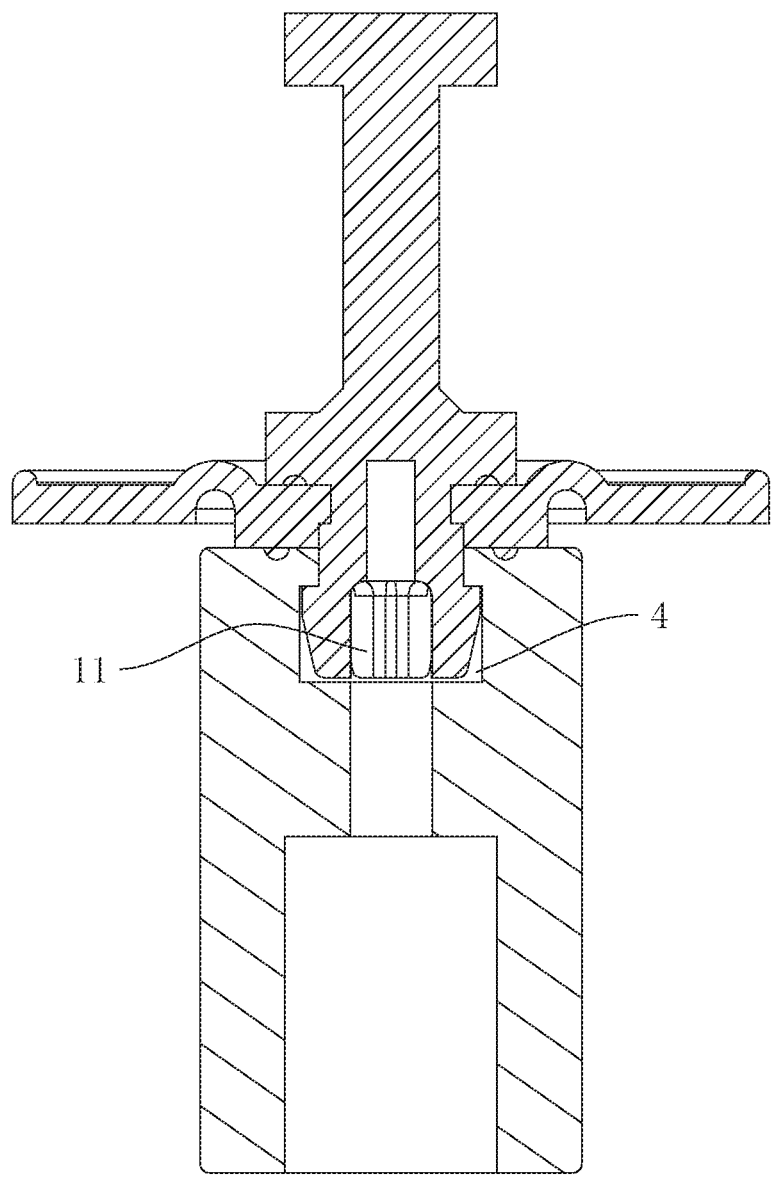
FIG. 5 schematically shows a structural view of a leading head in Embodiment 3.

As shown in FIGS. 4 and 5, a movable valve core is different from Embodiment 1 in that: a connector 5 comprises a first shaft section 7 connected with the bottom of a leading head 2, a second shaft section 8 connected with the first shaft section 7 and a third shaft section 9 connected with the second shaft section 8. Specifically, in order to prevent the connector 5 from being disengaged from a mounting hole 4, and to have a firm connection between the connector 5 and the mounting hole 4, the diameters of the third shaft section 9, the second shaft section 8 and the first shaft section 7 are reduced in sequence, such that the connector 5 is a radially step-shaped shaft.

Further, an annular blocking shoulder 10 is formed between the third shaft section 9 and the second shaft section 8, wherein the annular blocking shoulder 10 can match the mounting hole 4 radially and axially, such that the annular blocking shoulder 10 can hold the stepped portion of the mounting hole 4, thereby improving the stability of the connector 5 as fixed.

Figure 6:
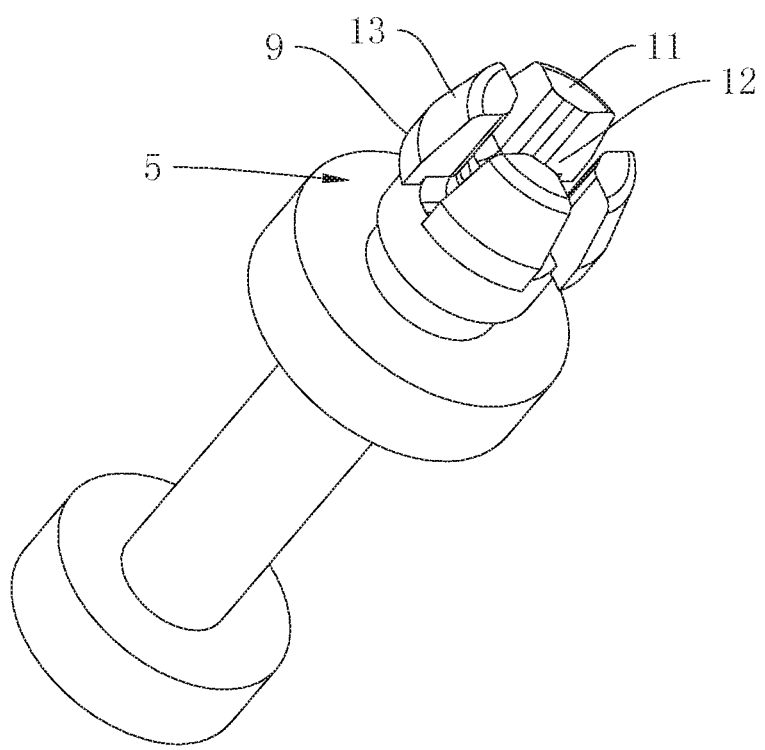
FIG. 6 schematically shows a cross-sectional structural view of Embodiment 3.

As shown in FIGS. 5 and 6, an end of the third shaft section 9 is provided with a flexible notch 12, which divides the end into a number of flexible petals 11, and with the arrangement of the flexible notch 12, the flexible petals 11 are flexible. Specifically, when the flexible petals 11 are pressed into the mounting hole 4, these flexible petals 11 can be deformed, and when the flexible petals 11 pass through the mounting hole 4 completely, these flexible petals 11 can recover from the deformation. Meanwhile, outer walls of the flexible petals 11 will abut against the inner wall of the mounting hole 4, thereby fixing the connector 5 to the mounting hole 4.

As shown in FIGS. 5 and 6, an outer wall of each flexible petal 11 is provided with a guiding surface 13 having a lower end tapered towards a central axis of the connector 5, and every side of each flexible petal 11 that faces away from the guiding surface 13 are rounded, which reduces the thickness of one end of each flexible petal 11 that faces towards the mounting hole 4, such that the flexible petal 11 can pass into the mounting hole 4 more readily. Moreover, each flexible petal 11 has a smooth surface, thereby avoiding any accidental injury. Meanwhile, the flexible petals 11 will have a stress-concentration relief.

Embodiment 4

Figure 7:
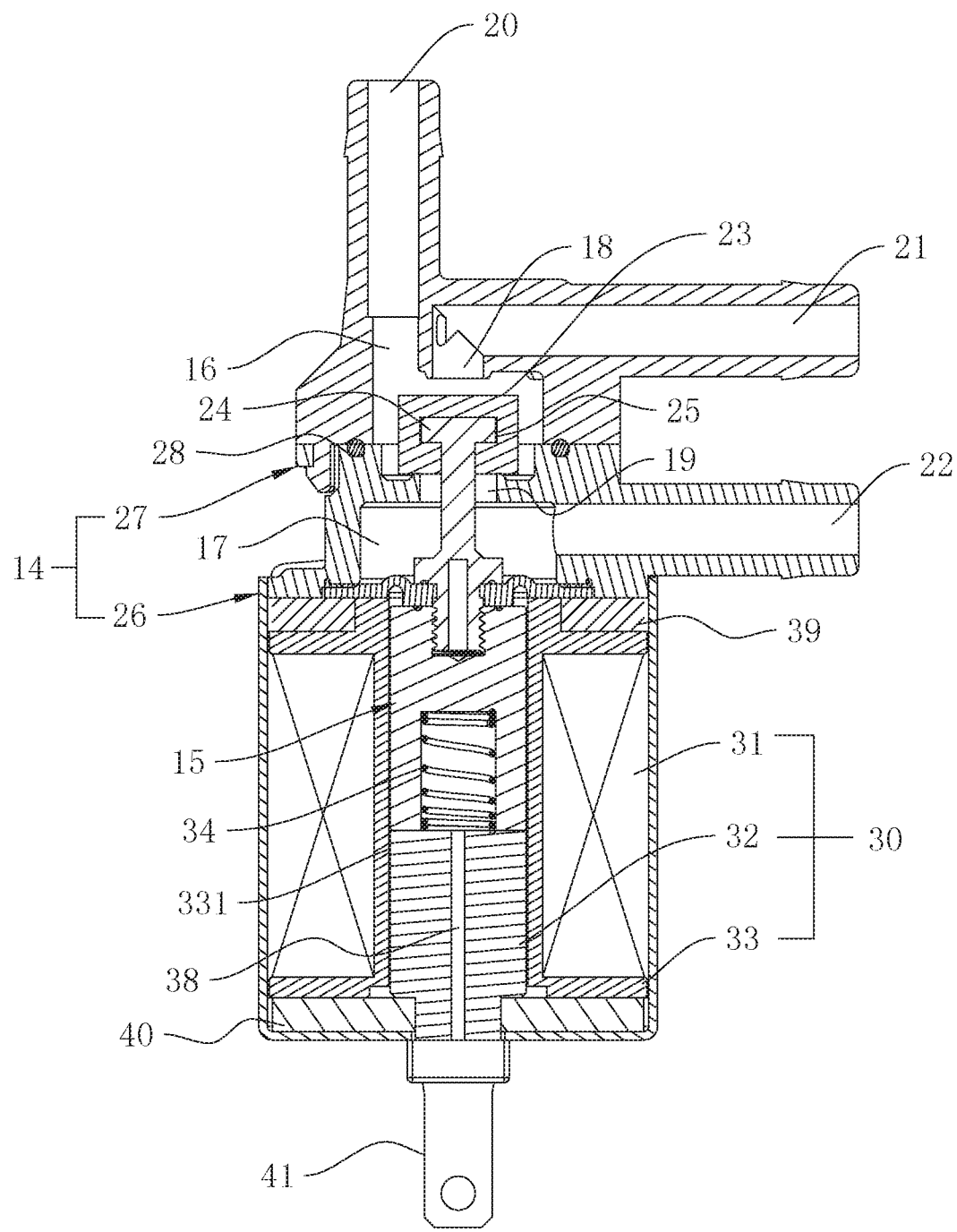
FIG. 7 schematically shows a cross-sectional structural view of Embodiment 4.

As shown in FIG. 7, an electromagnetic valve comprises a valve body 14 and a movable valve core 15 disposed in the valve body 14. The movable valve core 15 is made according to Embodiment 1. The valve body 14 is provided therein with a first cavity 16 and a second cavity 17, wherein the first cavity 16 is provided therein with an upper opening 18 and a lower opening 19, and the second cavity 17 is located below the first cavity 16, and is open to the lower opening 19 of the first cavity 16. The valve body 14 is provided with an inlet 20 in communication with the first cavity 16, a first outlet 21 in communication with the upper opening 18 and a second outlet 22 in communication with the second cavity 17. A gasket 23 is detachably connected to the top of the movable valve core 15 within the first cavity 16, and the gasket 23 has a first position in which the gasket 23 moves upward to seal the upper opening 18 and open the lower opening 19 and a second position in which the gasket 23 moves downward to seal the lower opening 19 and open the upper opening 18.

As shown in FIG. 7, the top of the movable valve core 15 is provided with a holder 24 that extends horizontally outward, and the bottom of the gasket 23 is provided with a T-shaped groove 25 for clamping holder 24 therein. Under the cooperation of the holder 24 with the T-shaped groove 25, the gasket 23 and the movable valve core 15 can be connected together in a removable manner for a reduced machining cost and an easy mounting.

It should be noted that the width of one side of the gasket 23 that abuts against the upper opening 18 or the lower opening 19 is larger than the width of the upper opening 18 and the lower opening 19. In other words, the gasket 23 can completely seal the upper opening 18 or the lower opening 19, thereby effectively avoiding a leakage of the medium.

Figure 8:
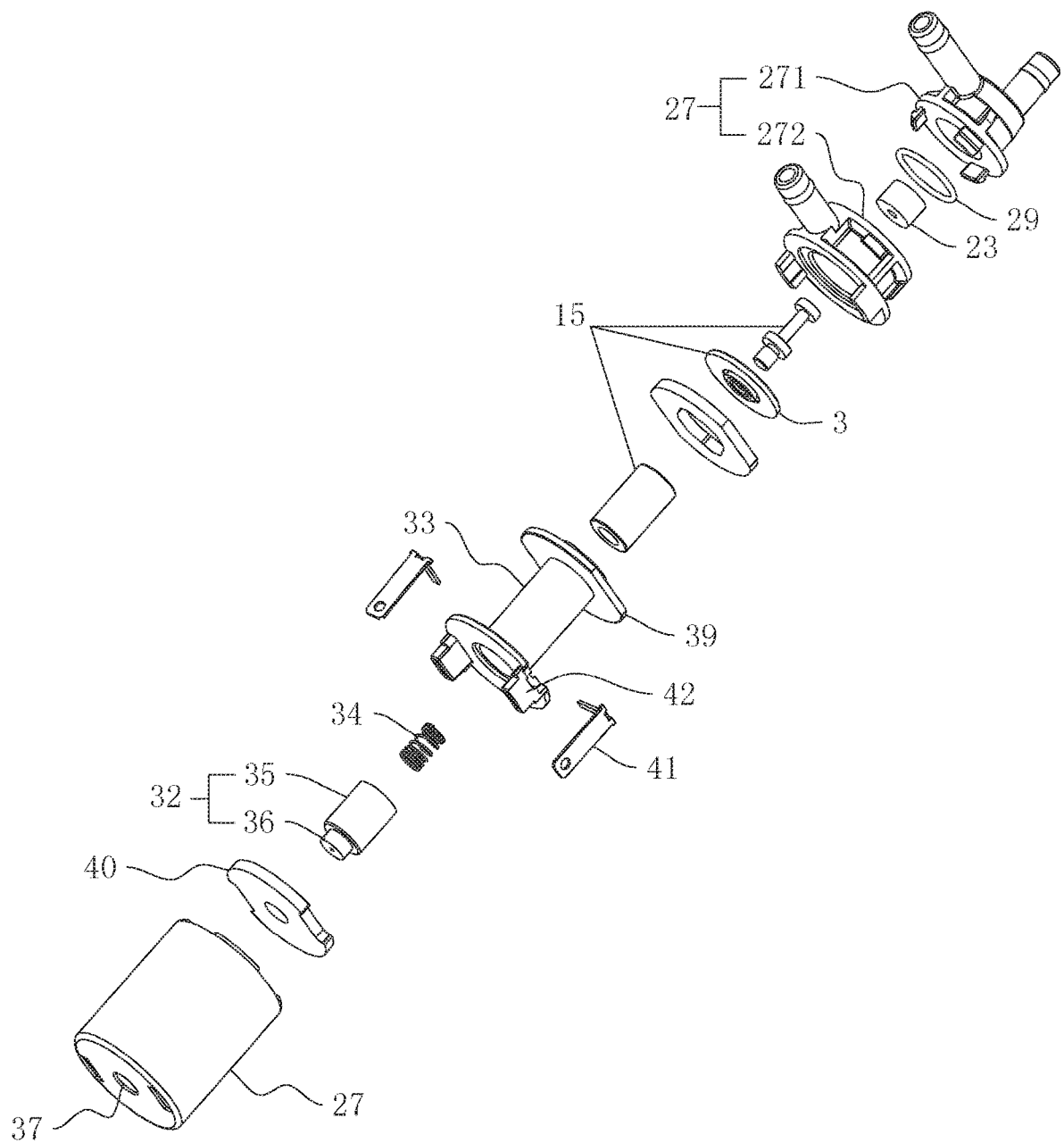
FIG. 8 schematically shows an exploded structural view of Embodiment 4.

As shown in FIGS. 7 and 8, the valve body 14 comprises a valve seat 26 and a valve cover 27, wherein the valve cover 27 is mounted to the upper end of the valve seat 26.

Specifically, the valve cover 27 comprises an upper valve cover 271 and a lower valve cover 272, wherein the upper valve cover 271 is screwed with the lower valve cover 272 tightly, the inlet 20 and the first outlet 21 are respectively disposed on two sides of the upper valve cover 271, the second outlet 22 is disposed on the lower valve cover 272, and the second outlet 22 and the first outlet 21 are disposed on the same side, which facilitates the connection of pipelines in the same direction, thereby effectively avoiding the situation in which pipes could be bent.

Further, an upper end face of the lower valve cover 272 is provided with an annular groove 28, and the annular groove 28 is provided therein with a sealing ring 29. The arrangement of the sealing ring 29 can improve the sealability between the upper valve cover 271 and the lower valve cover 272 so as to prevent the medium from leaking out of the valve body 14, thereby reducing a loss of the medium.

As shown in FIG. 7, the valve seat 26 receives a magnetic driving assembly 30 for driving the movable valve core 15 to move up and down. Specifically, the magnetic driving assembly 30 comprises an electromagnetic coil 31, a stationary iron core 32 and a frame 33, wherein the frame 33 has a substantially I-shaped cross-section. The electromagnetic coil 31 is sleeved around the frame 33, and the frame 33 defines a third cavity 331, wherein the stationary iron core 32 is disposed within the third cavity 331, and an upper end of the stationary iron core 32 is connected to a lower end of the movable valve core 15 through a spring 34. Therefore, when the electromagnetic coil 31 is de-energized, the movable valve core 15, when driven by the spring 34, slides towards one side of the valve cover 27, such that the upper opening 18 is sealed, and the lower opening 19 is opened; on the other hand, when the electromagnetic coil 31 is energized to generate a magnetic force and force the movable valve core 15 to come against the spring 34, and slides towards one side of the stationary iron core 32, such that the lower opening 19 is sealed, and the upper opening 18 is opened, thereby changing the flow direction of the medium. In addition, the water-proof membrane 3 seals the third cavity 331 against the second cavity 17, thereby preventing the metal members within the third cavity 331 from water and oxidization.

As shown in FIG. 8, the stationary iron core 32 comprises a main body 35 and an insertion portion 36 integrally formed with the main body 35 and extending away from the spring 34, wherein the outer diameter of the insertion portion 36 is smaller than that of the main body 35. A receptacle 37 is disposed respectively through the bottom wall of the valve seat 26 and an outer iron sheet 40 is passed through by the insertion portion 36, wherein the stationary iron core 32 is connected with the valve seat 26 by inserting the insertion portion 36 into the receptacle 37 so as to keep the stationary iron core 32 stable.

Further, the stationary iron core 32 is provided therein with an air vent 38 in communication with the third cavity 331 and the atmosphere. With the arrangement of the air vent 38, heat generated within the third cavity 331 can be discharged therefrom, thereby effectively controlling the temperature increase in the third cavity 331, and ensuring the normal operation of the electromagnetic valve.

As shown in FIG. 8, the top and the bottom of the frame 33 are provided respectively with an inner iron sheet 39 and an outer iron sheet 40 within the valve seat 26, and an end of the frame 33 adjacent to the inner iron sheet 40 is fixed with a pair of diametrically opposite PIN needles 41 for electrical connection with the electromagnetic coil 31.

Moreover, the inner iron sheet 40 and the outer iron sheet 39 axially oppositely cap the electromagnetic coil 31 and guide a magnetic field, and when the electromagnetic coil 31 is energized, the leakage of magnetic flux will be reduced.

Further, in order to avoid the situation in which the PIN needles 41 could contact the inner iron sheet 40 while projecting outward from the valve seat 26, the diametrically opposite sides of the inner iron sheet 40 are provided with a pair of grooves through which the PIN needles 41 pass clearly, and insulators 42 for insulating the PIN needles 41 from the inner iron sheet 40 extend axially from said end of the frame 33 adjacent to the inner iron sheet 40.

The invention operates in a manner as follows: when the movable valve core 15 moves upward, the upper opening 18 is sealed, and the lower opening 19 is opened; the medium enters through the inlet 20, and exits through the second outlet 22; on the other hand, when the movable valve core 15 moves downward, the lower opening 19 is sealed, and the upper opening 18 is opened; at this time, a medium enters through the inlet 20, and exits through the first outlet 21. Therefore, upon the action of the magnetic driving assembly 30, the gasket 23 can block any one of the first outlet 21 or the second outlet 22 according to the movement of the movable valve core 15, thereby changing the flow direction of the medium.

Embodiment 5

Figure 9:
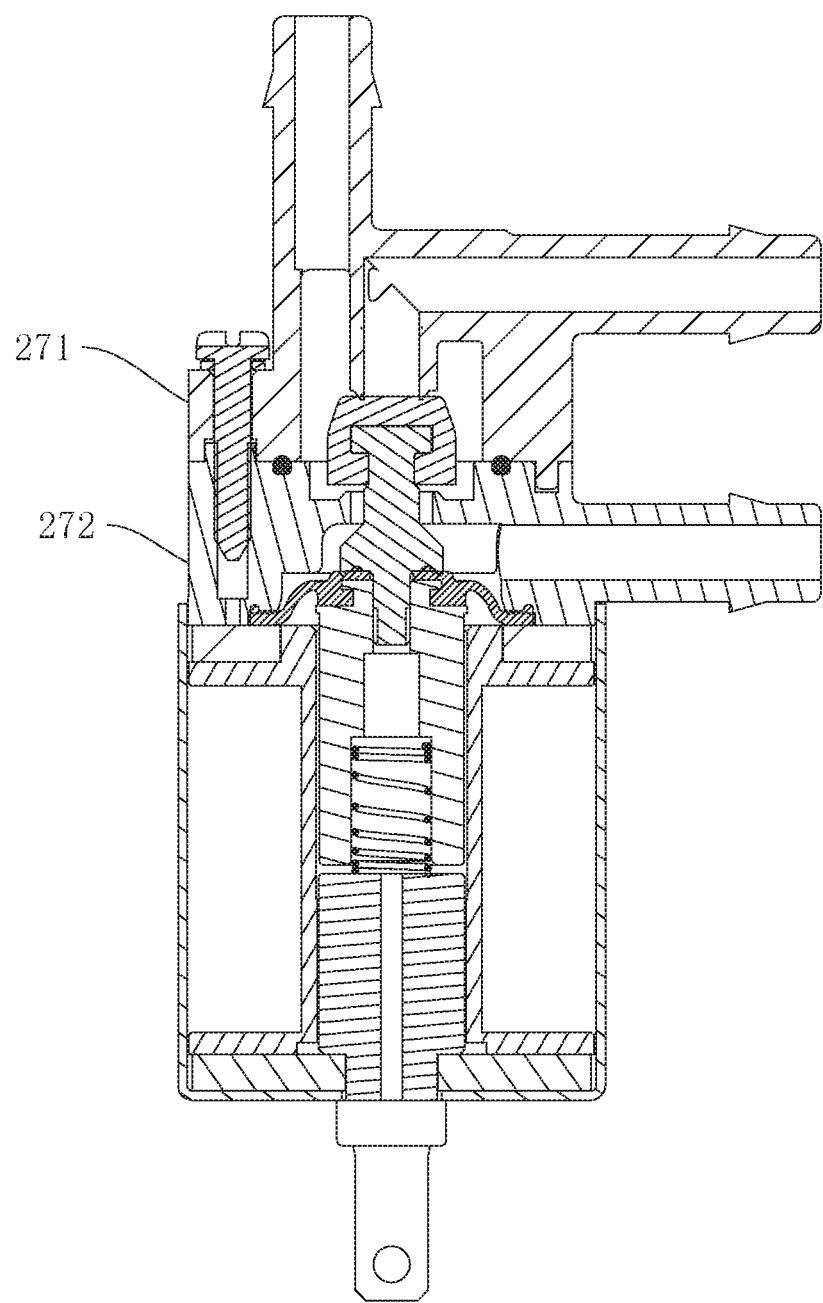
FIG. 9 schematically shows a cross-sectional structural view of Embodiment 5.

As shown in FIG. 9, an electromagnetic valve is different from Embodiment 4 in a movable valve core 15 of Embodiment 2.

In addition, the upper valve cover 271 and the lower valve cover 272 are fastened together tightly through a bolt in a removable manner; more importantly, this structure is simple, and the maintenance is easy.

What have been described above are merely preferred embodiments of the present invention, and not intended to limit the present invention. All the modifications, equivalents, improvements and the like that are made without departing from the concept of the present invention shall be covered by the scope of protection of the present invention.

The invention claimed is:

1. A movable valve core, comprising a cylindrical core body (1) defining a central axis, a leading head (2) fixed to the core body (1) removably, and a water-proof valve membrane (3) sandwiched between the core body (1) and the leading head (2), wherein a mounting hole (4) is axially formed in the core body (1), and a connector (5) for projecting into the mounting hole (4) extends axially from the bottom of the leading head (2), and the connector (5) is fixed into the mounting hole (4);

wherein the connector (5) is provided with a flexible notch (12) open axially and radially, thereby dividing the connector (5) into a plurality of flexible petals (11), and wherein the connector (5) comprises a first shaft section (7) formed axially and integrally with the leading head (2) and connected with the bottom of the leading head (2), a second shaft section (8) formed axially and integrally with the first shaft section (7) and a third shaft section (9) formed axially and integrally with the second shaft section (8), and wherein the flexible notch (12) is formed in the third shaft section (9), and the diameters of the third shaft section (9), the second shaft section (8) and the first shaft section (7) are reduced in sequence.

2. The movable valve core of claim 1, wherein the connector (5) is provided with an outer thread (6), and the leading head (2) is screwed into the mounting hole (4).

3. The movable valve core of claim 1, wherein a plurality of cutouts (216) are formed into the connector (5) axially and radially, and wherein the connector (5) is fixed into the mounting hole (4) in an interference fit.

4. The movable valve core of claim 1, wherein said plurality of flexible petals (11) is formed with a guiding surface (13) tapered axially (5).

5. The movable valve core of claim 4, wherein each flexible petal (11) is rounded.

6. The movable valve core of claim 1, wherein the mounting hole (4) is engaged with the third shaft section (9) and the second shaft section (8) of the connector (5) radially and axially.

7. The movable valve core of claim 1, wherein the water-proof valve membrane (3) is disposed around the leading head (2), and wherein the water-proof valve membrane (3) is corrugated co-axially.

* * * * *